United States Patent [19]
Mellen

[11] 3,818,995
[45] June 25, 1974

[54] TWO WAY PLOW WITH ARTICULATED CENTER WHEEL AND AUTOMATICALLY LOCKABLE REAR WHEEL

[75] Inventor: William F. Mellen, Anaheim, Calif.

[73] Assignee: Alice Marian Mellen, Anaheim, Calif.

[22] Filed: June 8, 1973

[21] Appl. No.: 368,443

Related U.S. Application Data

[63] Continuation-in-part of Ser. No. 262,356, June 13, 1972, Pat. No. 3,771,607.

[52] U.S. Cl............... 172/212, 172/225, 172/282, 172/289
[51] Int. Cl............................................ A01b 3/28
[58] Field of Search .......... 172/212, 224, 225, 282, 172/285, 286, 288, 289

[56] References Cited
UNITED STATES PATENTS

| | | | |
|---|---|---|---|
| 2,930,335 | 3/1960 | Hage | 172/282 X |
| 3,532,172 | 10/1970 | Richey | 172/212 |
| 3,537,534 | 11/1970 | Richey | 172/212 |
| 3,703,932 | 11/1972 | Tuttle et al. | 172/288 |
| 3,749,178 | 7/1973 | Watts | 172/212 X |

Primary Examiner—Robert E. Pulfrey
Assistant Examiner—Paul T. Sewell

[57] ABSTRACT

A two way plow capable of being drawn by a power vehicle having a vertically movable hitch. The plow includes an elongate rearwardly extending draft member that pivotally supports a plow bottom supporting assembly that by hydraulically operated means may be placed on either side of the draft member for plowing purposes. A first vertically movable, hydraulically controlled wheel assembly is located at a position intermediate the ends of the draft member, with the wheel assembly capable of being moved upwardly relative to the draft member as the latter is lowered by manipulation of the hitch to maintain the draft member in a horizontal position. The first wheel assembly when in an elevated position is free to pivot relative thereto, but when lowered relative to the draft member to maintain the plow bottom supporting assembly in a non-plowing position, such as is necessary when the plow is being transported or turned around in the headland, the wheel assembly interlocks with articulate means and the wheel assembly thereafter pivots in a direction to cause the wheel assembly to track with the path of the power vehicle. A second wheel assembly is so movably supported from the rear of the draft member that the second wheel assembly automatically assumes a locked angular position relative to the draft member to compensate for side thrust developed by the bottom in moving through the soil when the plow bottom supporting assembly is pivoted from one side of the draft member to the other side thereof.

9 Claims, 15 Drawing Figures

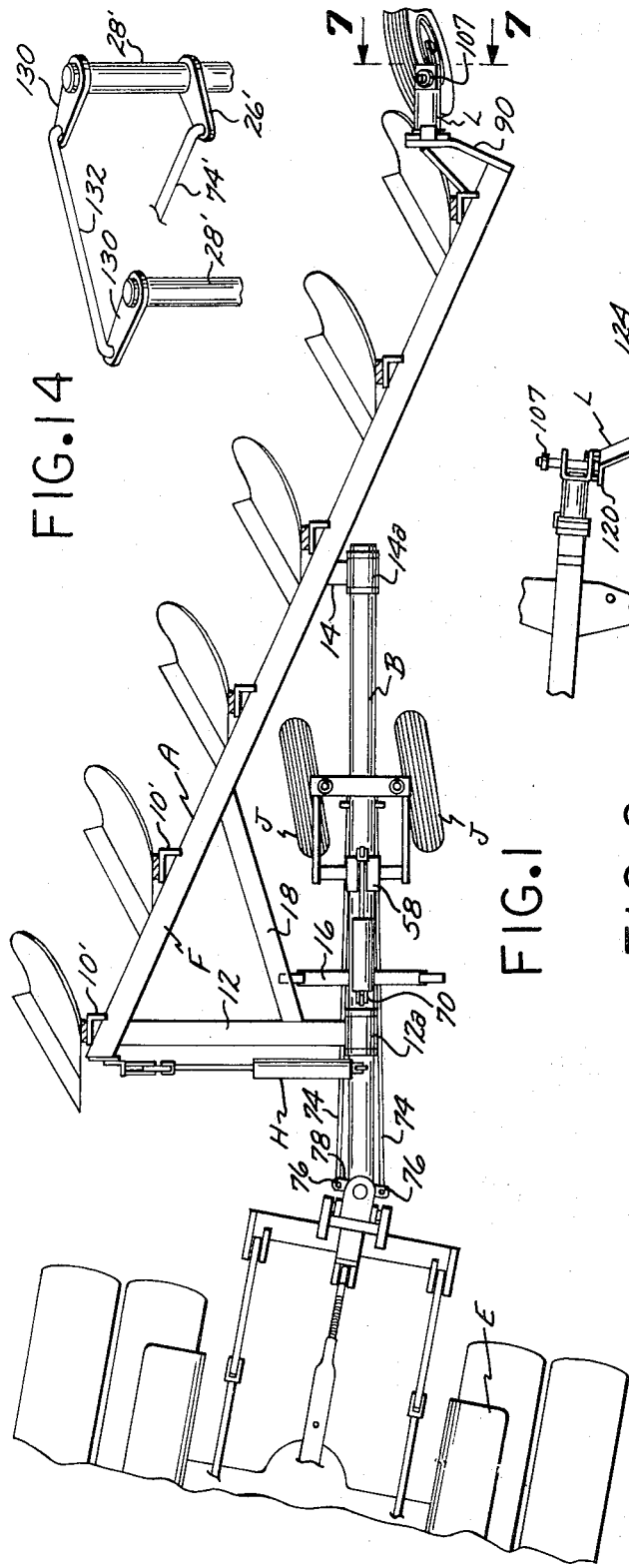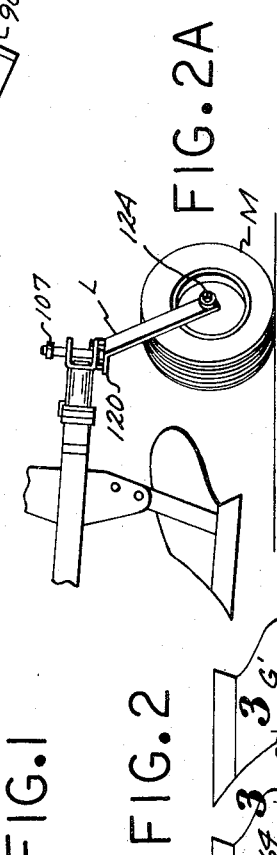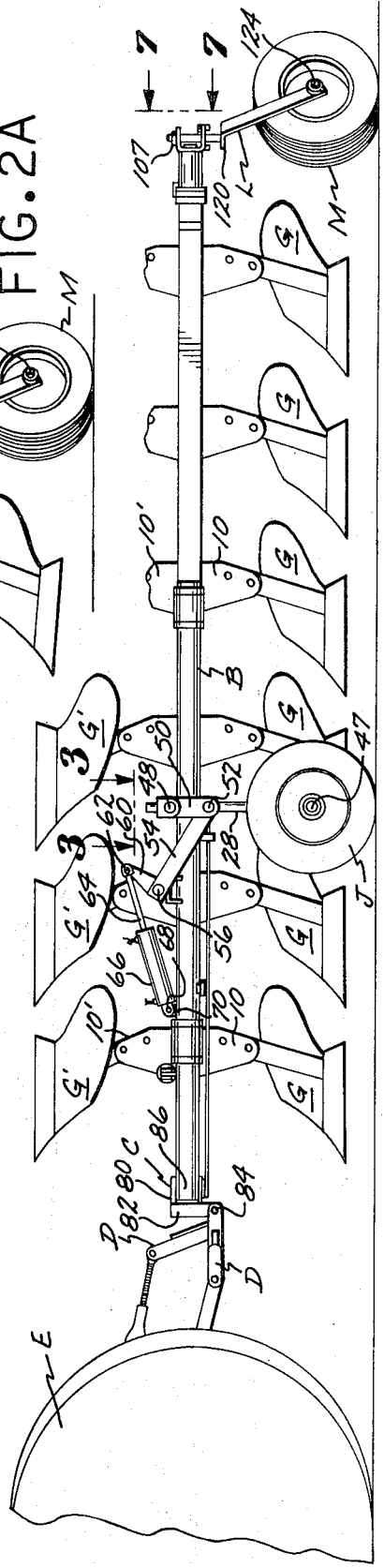

PATENTED JUN 25 1974　　3,818,995

FIG.10

TWO WAY PLOW WITH ARTICULATED CENTER WHEEL AND AUTOMATICALLY LOCKABLE REAR WHEEL

CROSS REFERENCE TO RELATED APPLICATION

This application in a continuation-in-part of U.S. Pat. application Ser. No. 262,356, filed June 13, 1972 entitled TWO WAY PLOW, now U.S. Pat. No. 3,771,607.

BACKGROUND OF THE INVENTION

1. Field of the Invention

Two way plow with articulated center wheel and automatically lockable rear wheel.

2. Description of the Prior Art

In the past numerous two way plows have been developed and used, but such devices have the operational disadvantages that they require an excessive amount of space in the headlands of a field in which to turn and plow in the opposite direction. Also, such plows have the operational disadvantage that no satisfactory means are provided thereon to automatically pivot the rearwardly disposed wheel thereon to a desired angled position to counteract side forces developed by the bottoms in moving through the soil when the plow bottom supporting assembly is pivoted from one side of the draft member to the other side thereof.

A major object of the present invention is to provide a two way plow which when used substantially overcomes the operational disadvantage of prior art devices of this nature as above identified.

SUMMARY OF THE INVENTION

A two way plow adapted for being drawn by a power vehicle having a vertically movable hitch that is pivotally connected to the forward end of an elongate draft member, which draft member on the rearward end supports a bracket that has a first tube extending rearwardly therefrom.

A number of oppositely disposed longitudinally spaced first and second plow bottoms are secured by supports to an elongate frame that has forward and rearward arms extending therefrom that are substantially normal to the supports. The arms on the free ends thereof support sleeves or other bearing means that are in coaxial alignment and pivotally engage the elongate draft member.

A first wheel assembly is slidably and pivotally supported from the draft member intermediate the ends thereof, and preferably between the forward and rearward arms. First and second hydraulically operated means serve to pivot the plow bottom supporting assembly from one side of the draft member to the other and to raise the first wheel assembly relative to the draft member.

When the hitch is moved downwardly to lower the plow bottom supporting assembly to a plowing position the second hydraulically operated means are actuated to move the first assembly upwardly to the extent that it does not support the weight of the plow and is freely pivotable. Upon the plow reaching the headland, or when the plow is being transported from one field to another, the second hydraulically operated means are actuated to move the first wheel assembly downwardly relative to the draft member as the hitch is being moved upwardly. Both of these operations are preferably conducted concurrently so that the draft member remains substantially horizontal. As the first wheel assembly moves downwardly it interlocks with articulated means, and so remains when it supports the weight of the plow. Due to such articulated means the first wheel assembly will be pivoted to track with the power vehicle when the latter is turning around in the headland or negotiating a turn on a road.

When the plow bottoms are drawn through soil in plowing the latter, the plow bottoms exert a substantial side thrust on the plow, which thrust unless compensated for would tend to move the plow out of longitudinal alignment with the power vehicle. To overcome this side thrust a second wheel assembly is provided at the rearward end of the plow, and is supported by a second tube that rotatably engages the first tube. By use of stop means and a lug removably engaged thereby the second wheel assembly is automatically moved to an angled position to overcome this side thrust when the plow bottom supporting assembly is pivoted from one side of the draft member to the other side thereof.

When the first wheel assembly is moved downwardly to support a portion of the weight of the plow, an insert may be added to the second wheel assembly to maintain it in a freely pivotal condition where the second wheel assembly also supports a portion of the weight of the plow and will not be engaged by stops mounted on the supporting bracket. When the insert is so added the second wheel assembly acts as a caster, and will track with the first wheel assembly.

BRIEF DESCRIPTION OF THE DRAWING

FIG. 1 is a top plan view of the two way plow connected to a power vehicle having a vertically movable hitch;

FIG. 2 is a side elevational view of the two way plow prior to the plow assuming the position shown in FIG. 2a;

FIG. 2a is a side elevational view of the rearward portion of the two way plow with the second wheel assembly riding on the stops in an angular position.

FIG. 10 is a fragmentary vertical cross sectional view of the support for the second wheel assembly and the insert in place therein;

FIG. 14 is a perspective view of an alternate form of articulated means for pivoting the first wheel assembly.

DESCRIPTION OF THE PREFERRED EMBODIMENTS

Figure 3:
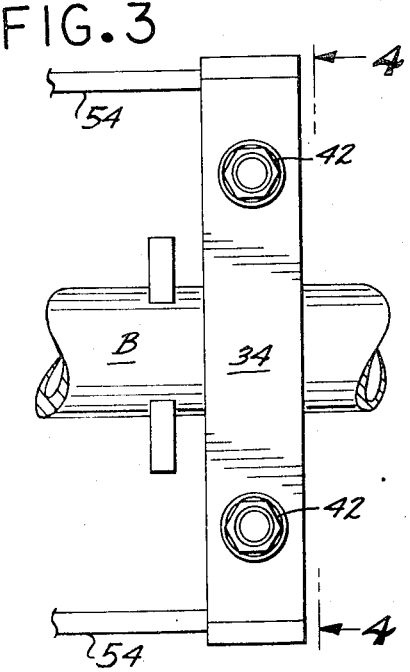
FIG. 3 is a fragmentary top plan view of the support for the forward wheel assembly.

A two way plow A is shown in FIGS. 1 and 2 that includes an elongate rigid draft member B that has the forward end thereof connected by pivotal means C to a vertically movable hitch D that is supported rearwardly of a power vehicle E. An elongate rigid member F is angularly disposed relative to draft member B, with the member having a number of longitudinally spaced first and second supports 10 and 10' extending outwardly therefrom in opposite directions, and the supports having a number of first and second plow bottoms G and G' secured thereto.

Forward and rearward longitudinally spaced arms 12 and 14 extend outwardly from member F and have sleeves 12a and 14a on the free ends thereof that are rotatably mounted on draft mem-er B as shown in FIG. 1. Sleeves 12a and 14a are in coaxial alignment. First hydraulically operated means H are provided for pivoting the first and second plow bottoms G and G' from one side of the draft member B to the other side thereof as is conventional with two way plows.

A transverse stop 16 is secured to draft member B as shown in FIG. 1. Stop 16 may be contacted by a strut 18 that extends between arm 12 and member F as shown in FIG. 1. Such contact occurs when member F and plow bottoms G and G' pivot from one side of draft member B due to the actuation of first hydraulic means H.

Figure 4:
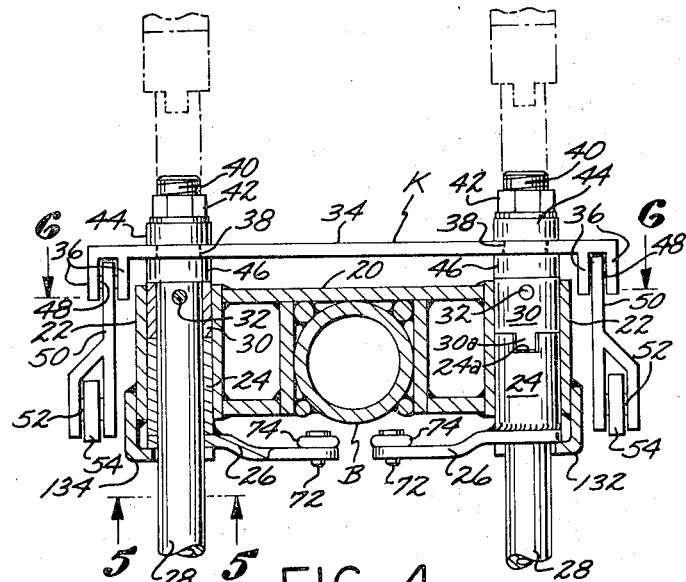
FIG. 4 is a side elevational view of the support for the first wheel assembly taken on the line 4—4 of FIG. 3.
Figure 5:
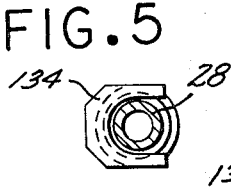
FIG. 5 is a fragmentary bottom plan view of the portion of the support for the first wheel assembly taken on the line 5—5 of FIG. 4.
Figure 6:
FIG. 6 is a transverse cross sectional view of the support for the first wheel assembly taken on the line 6—6 of FIG. 4.

A rigid box 20 is secured to draft member B by welding or the like and is preferably situated between first and second sleeves 12a and 14a. The box includes two tubular, vertically disposed, transversely spaced bearings 22 that rotatably support two tubes 24 that have arms 26 secured thereto that extend inwardly towards one another. Two clips 134 secured to the lower portions of bearings 22 prevent tubes 24 from being displaced downwardly relative to the bearings as shown in FIG. 4. Two shafts 28 extends upwardly through tubes 24. The shafts 28 have cylindrical collars 30 rigidly secured thereto above the tubes 24 as best seen in FIG. 4, by pins 32 or other conventional fastening means.

A cross member 34 is situated above box 20, with the cross member having downturned pairs of lugs 36 on the ends thereof. Shafts 28 extend upwardly through openings 38 in cross member 34 and the upper ends of the shafts having threads 40 thereon that are engaged by nuts 42. First and second tubular bearings 44 and 46 are mounted on shafts 28 and situated above and below cross member 34 as shown in FIG. 4. The lower ends of the shafts 28 rotatably support a pair of pneumatic tired first wheels J as shown in FIGS. 1 and 2 on stub shafts 47.

Each pair of lugs 36 has a pin 48 extending therebetween that pivotally engages the upper end of a first link 50 that has the lower end thereof connected by a pin 52 to the forward end of a second link 54. The forward end of each second link 54 is rigidly secured to a transverse shaft 56 that is rotatably supported by a bearing 58 that is secured to draft member B. A rigid arm 60 is secured to shaft 56 and extends upwardly therefrom as shown in FIG. 2.

A pin 62 pivotally connects the upper end of arm 60 to the rearward end of a piston rod 64 that extends into a hydraulic cylinder 66. The end of the cylinder 66 opposite that from which piston rod 64 extends is pivotally connected by a pin 68 to a bracket 70 secured to draft member B.

The wheels J and the elements previously described as associated therewith are considered to comprise a first wheel assembly K and are so indicated on the drawings.

The arms 26 are by pins 72 pivotally connected to the rearward ends of two elongate actuating members 74 that have their forward ends pivotally connected by pins 76 to opposite ends of a transverse bar 78. Bar 78 forms a part of a channel shaped bracket 80 that is secured to an upright 82 that by pin 84 is pivotally secured to hitch D. A pin 86 pivotally secures the forward end of draft member B to bracket 80. Upright 82, bracket 80, and bar 78 cannot pivot in a horizontal plane relative to hitch D.

In FIG. 4 it will be seen that each collar 30 includes at least one tooth 30a formed in the upper portion of tube 24 when the first wheel assembly K is disposed as shown in FIG. 4.

When the hitch D is lowered and the second hydraulic cylinder 66 actuated to move the cross member 34 and shafts 28 upwardly relative to the draft member B, the collars 30 are vertically separated from tubes 24 and the positions of wheels J are no longer controlled by rods 74 with the weight of the plow now being borne by either the first or second plow bottoms G or G'. When it is desired to transport the plow A from one location to another on a road and when it is desired to turn the plow in a headland, the hitch D is caused to move upwardly and the first wheel K downwardly by actuation of the second hydraulic cylinder 64. A substantial weight of the plow is now transferred to first wheels J, and the collars 30 and first tubes 24 are now forced into engagement as shown in FIG. 4. Turning movement of power vehicle E causes opposite movement of the two actuating rods 74 with the arms 26 and tubes 24 being so moved as a result thereof that shafts 28 and wheels J pivot in unison to track with the path of the power vehicle E. Due to such tracking the space required for turning the two way plow is substantially lessened in the headland in which this operation is performed.

To counteract the side thrust that is generated as the plow bottoms are drawn through the earth to plow the same a second wheel assembly L is preferably included on the rearward portion of the plow A as shown in FIGS. 1, 2 and 2a with the assembly being angularly disposed during the plowing operation for the wheel thereof to engage the side of a furrow.

Figure 8:
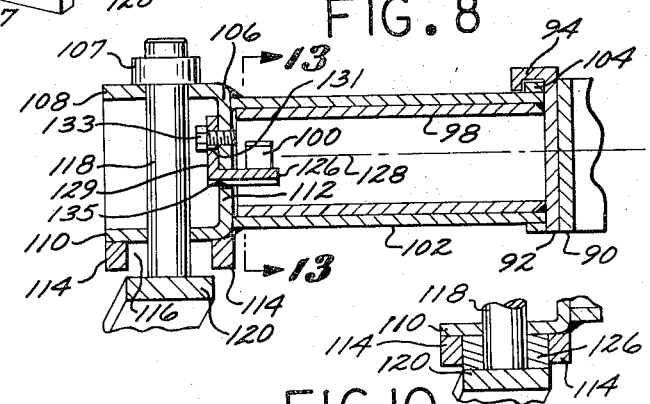
FIG. 8 is a longitudinal cross sectional view of the support for the second wheel assembly taken on the line 8—8 of FIG. 7.

The second assembly L as best seen in FIG. 1 includes a bracket 90 secured to the rearward end of member F. Bracket L has a circular plate 92 secured thereto as shown in FIG. 8 that has a rearwardly and inwardly extending lip 94 on a portion of the periphery thereof. A first tube 98 extends rearwardly from plate 92, with the rearward interior surface of first tube 98 having an inwardly projecting lug 100 secured thereto.

A second tube 102 rotatably engages first tube 98. Second tube 102 has an arcuate rib 104 extending outwardly therefrom in which an opening 96 is formed of greater width than that of the lip 94. Rib 104 is slidably situated within the confines of lip 94 to removably support the second tube 102 on first tube 98. By longitudinally aligning lip 94 with opening 96 the second tube may be slid from the first tube.

The rearward end of second tube 102 has a channel shaped member 106 secured thereto, which member includes upper and lower rearwardly extending flanges 108 and 110. Flange 108 and 110 are connected by a web 112.

Two spaced transversely extending stops 114 project downwardly from lower flange 110 and define a space 116 therebetween. A bolt 118 is rotatably and slidably supported by flanges 108 and 110 and is secured on the upper end by a sleeve 107 and pin 109, and on the lower end thereof to a bar 120 of such width as to be positionable in opening 116. Bar 120 develops on one end into a downwardly extending member 122 that by a stub shaft 124 rotatably supports a second wheel M.

Figure 12:
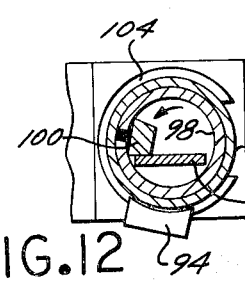

Web 112 rigidly supports a forwardly extending plate 126 that is offset from the centerline 128 of first tube 98. The plate 126 when horizontally disposed as shown in FIG. 12 has the ends thereof adjacently disposed to the interior surface of first tube 98.

Figure 9:
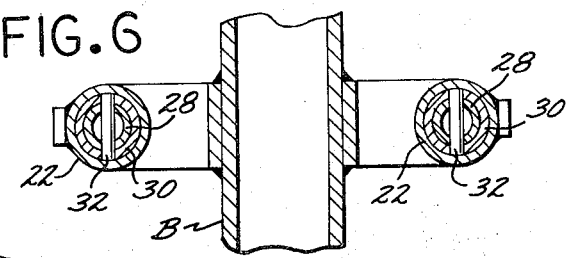
FIG. 9 is a perspective view of an insert that may be used to maintain the second wheel assembly in a freely pivotable condition.
Figure 7:
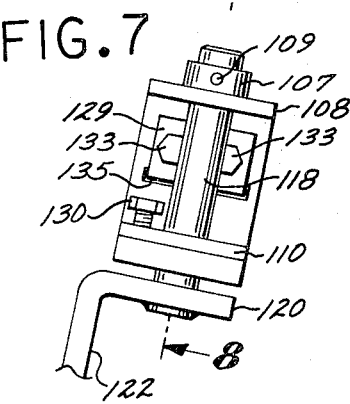
FIG. 7 is an end elevational view of the support for the second wheel assembly.
Figure 11:
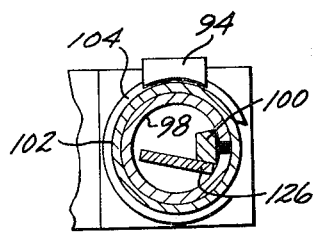
FIG. 11, 12 and 13 are transverse cross sectional views of a portion of the support for the second wheel assembly when in different position, with FIG. 13 being taken on the line 13—13 of FIG. 8.
Figure 13:
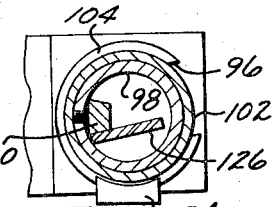

When the plow bottoms G and G' are in a first plowing position the lug 100 is so disposed as to tilt plate 126 as shown in FIG. 11 and position member 122 and wheel M at a desired angle, preferably 12°, to counteract the side thrust generated by the plow bottoms G or G' as the latter are drawn through the earth to plow the same. When the plow bottoms G and G' are pivoted to the opposite side of draft member B, the lug 100 will move to the position illustrated in FIG. 13 to tilt member 122 and second wheel M to an oppositely disposed angular position. The degree of angulation of wheel M in the first and second positions is determined by the distance of plate 126, relative to centerline 128 and the degree this off-centered plate can be pivoted by lug 100 prior to the longitudinal edge of the plate nearest the lug being forced into binding contact with the interior of tube 98 as shown in FIGS. 11 and 13. The plate 126 forms a part of L-shaped member 129 that has a vertically extending slot 131 therein that is adjustably engaged by a screw 133 that is secured to web 112. The plate 126 extends through a slot 135 in web 112, which slot is of greater depth than the thickness of the plate. When the draft member B is positioned as shown in FIG. 2, the second wheel M is free to pivot. When it is desired to have the rear wheel M pivot freely while bearing a portion of the load of plow A, when the latter is in a transporting position the block 127 shown in FIG. 9 that has a slot 128 therein may be placed is space 116, and removably held therein by a screw 130 that at all times engages a tapped bore (not shown) in flange 110. The screw 130 may be caused to engage a tapped bore in block 127. The screw 130 controls the depth to which bar 120 may enter the space 116 when the plow is in a plowing position.

Tubes 24 are prevented from inadvertently sliding downwardly on shafts 28 by clips 134 secured to tubes 22 as shown in FIG. 4. The opening 96 when longitudinally aligned with lip 94 permits the assembly of which rear wheel M forms a part to be separated from the two way plow.

In the alternate form of articulated means shown in FIG. 14 elements common to the first form previously described and illustrated in FIGS. 1, 2, 3 and 4 are identified by the same numerals previously used but with a prime being added thereto. In the alternate form but a single arm 26' is used that is pivotally connected to a single actuating member 74' that extends forwardly and is connected to hitch D as previously described. Each of the shafts 28' has a lever 130 rigidly secured thereto as shown in FIG. 14, and the arms pivotally connected at their free ends by a rigid elongate member 132. Movement of actuating member 74' relative to arm 26' such as occurs when the power vehicle E turns is transmitted to the shaft 28' on which the arm is mounted to cause the shaft to pivot. Such pivotal movement is transmitted through arms 130 and member 132 to the other shaft 28', and as a result the shafts 28' pivot in unison and accomplish the same results as the first form previously described.

The use and operation of the invention has been described previously in detail and need not be repeated.

I claim:

1. In combination with a power vehicle having a rearwardly disposed vertically movable hitch extending rearwardly therefrom, a two way plow of the type that includes an elongate draft member extending rearwardly from said hitch and pivotally connected thereto, said draft member pivotally supporting a two way plow bottom supporting assembly that may be disposed on either side of said draft member for plowing purposes, first power means for pivoting said plow bottoms supporting assembly from one side of said draft member to the other side thereof for plowing purposes, the improvement for permitting said power vehicle and two way plow to turn and reverse their direction of travel in a minimum of space, said improvement comprising:

a. at least first wheel assembly adjacently disposed to said draft member and located intermediate the ends thereof, said wheel assembly including a vertically disposed shaft that has a lower end portion and a wheel rotatably supported from said lower end portion in a plane of rotation substantially parallel to said shaft;
   b. first means mounted on said draft member for supporting said shaft for vertical and horizontal rotational movement relative to said draft member;
   c. second means that are power operated for raising and lowering said first wheel assembly relative to said draft member in a direction opposite to that of said hitch to maintain said draft member in a substantially horizontal position;
   d. articulated means so operatively associated with said power vehicle, first means and shaft that said shaft and wheel are pivoted for said wheel to track with the path of movement of said power vehicle when said shaft and wheel have been moved downwardly relative to said draft member to the extent said plow bottoms supporting assembly is disposed in a non plowing position and said wheel supports a substantial portion of the weight of said two way plow, with said wheel as it so pivots to track with said power vehicle permitting said power vehicle and two way plow to turn in a minimum of space; and e. third means that automatically release said shaft from control by said articulated means to permit free rotation of said shaft and wheel when said hitch is moved downwardly to dispose said two way plow bottom supporting assembly in a plowing position and said first wheel assembly is moved upwardly relative to said draft member to a position where said wheel does not bear any of the load of said two way plow, and said wheel assembly is no longer controlled by said articulated means.

2. The combination as defined in claim 1 in which said two way plow bottom supporting assembly includes two longitudinally spaced sleeves rotatably mounted on said draft member and said first wheel assembly is located between said first and second sleeves and supported from said draft member.

3. The combination as defined in claim 1 which in addition includes:
  e. second wheel assembly pivotally supported from said two way plow bottoms supporting assembly and rearward of said first wheel assembly, said second wheel assembly capable of being disposed in either first or second angular positions relative to the vertical for said second wheel to engage a portion of plowed ground to counteract the side thrust exerted on said two way plow as the plow bottoms of said plow bottoms supporting assembly are drawn through the earth;
  f. fourth means actuated by the movement of said two waY plow bottoms supporting assembly as the latter is pivoted from one side of said draft member to the other side thereof, with said fourth means when so actuated automatically pivoting said second wheel assembly to either said first or second angular position; and
  g. fifth means for automatically locking said second wheel assembly in said first or second angular position as said draft member is lowered to dispose said plow bottoms supporting assembly in a plowing position.

4. The combination as defined in claim 3 which in addition includes:
  h. a pin secured to said second wheel assembly that slidably engages said fourth means and is longitudinally movable relative to the latter, said pin serving to maintain said second wheel assembly in a connected position to said fourth means when said draft member is moved upwardly to dispose said plow bottoms supporting assembly in a nonplowing position.

5. The combination as defined in claim 4 in which said fifth means are supported from said fourth means, with said fifth means being disengaged from said second wheel assembly to allow the latter and said pin to pivot freely on said fourth means when said draft member is raised to dispose said plow bottoms supporting assembly in a non plowing position.

6. The combination as defined in claim 5 which in addition includes:
  i. sixth means for being removably positioned between said fourth means and the portion of said wheel assembly below said pin to maintain said fifth means out of locking engagement with said second wheel assembly and permit the latter to pivot freely when said draft member is so disposed that said plow bottoms supporting assembly is in a non plowing position and said first and second wheel assemblies bear a substantial portion of the weight of said two way plow.

7. The combination as defined in claim 1 in which two of said first wheel assemblies are provided that are disposed side by side and move vertically and pivot in unison, with one of said first and third means being provided for each of said first wheel assemblies, and both of said first wheel assemblies being moved vertically in unison by said second means.

8. The combination as defined in claim 3 in which said fourth means is:
  h. a first horizontal tube that extends rearwardly from said plow bottoms supporting assembly and pivots concurrently therewith;
  i. a lug rigidly secured to the interior surface of said first tube;
  j. a second tube rotatably supported on said first tube;
  k. a rigid support secured to said second tube rearwardly of said first tube, said support supporting said second wheel assembly; and
  l. a rectangular plate secured to said support and that extends into said first tube below the center line thereof, said plate being engaged by said lug to pivot said second tube, support and second wheel assembly to first or second angular positions when said plow bottoms supporting assembly pivots from one side of said draft member to the other thereof, when said second wheel assembly being in said first or second angular position when the longitudinal edge most adjacent said lug is forced into binding contact with the interior surface of said first tube.

9. The combination as defined in claim 8 in which said second wheel assembly is supported for pivotal and vertical movement relative to said support, and said fifth means are a pair of spaced stops that project downwardly from said support and engage a portion of said second wheel assembly therebetween when said draft member is lowered to dispose said plow bottoms supporting assembly in a plowing position.

* * * * *